(12) United States Patent
Wang et al.

(10) Patent No.: US 10,112,830 B2
(45) Date of Patent: Oct. 30, 2018

(54) SHAPED CATALYST FOR SOUR GAS SHIFT REACTIONS AND METHODS FOR USING THEM

(71) Applicant: CLARIANT CORPORATION, Louisville, KY (US)

(72) Inventors: Justin X. Wang, Louisville, KY (US); William M. Faris, Louisville, KY (US); David Tolle, Louisville, KY (US); Marc K. Born, Louisville, KY (US); Yeping Cai, Louisville, KY (US)

(73) Assignee: Clariant Corporation, Louisville, KY (US)

( * ) Notice: Subject to any disclaimer, the term of this patent is extended or adjusted under 35 U.S.C. 154(b) by 45 days.

(21) Appl. No.: 14/563,084

(22) Filed: Dec. 8, 2014

(65) Prior Publication Data

US 2016/0158735 A1    Jun. 9, 2016

(51) Int. Cl.
| | |
|---|---|
| *C01B 3/16* | (2006.01) |
| *B01J 35/10* | (2006.01) |
| *B01J 35/02* | (2006.01) |
| *B01J 37/20* | (2006.01) |
| *B01J 35/00* | (2006.01) |
| *B01J 21/04* | (2006.01) |
| *B01J 37/04* | (2006.01) |
| *B01J 23/887* | (2006.01) |
| *B01J 37/02* | (2006.01) |

(52) U.S. Cl.
CPC ............... *C01B 3/16* (2013.01); *B01J 21/04* (2013.01); *B01J 23/8871* (2013.01); *B01J 23/8872* (2013.01); *B01J 35/002* (2013.01); *B01J 35/0026* (2013.01); *B01J 35/023* (2013.01); *B01J 35/026* (2013.01); *B01J 35/1014* (2013.01); *B01J 35/1019* (2013.01); *B01J 35/1038* (2013.01); *B01J 35/1042* (2013.01); *B01J 37/0201* (2013.01); *B01J 37/04* (2013.01); *B01J 37/20* (2013.01); *C01B 2203/0283* (2013.01); *C01B 2203/1041* (2013.01); *C01B 2203/1052* (2013.01); *C01B 2203/1082* (2013.01); *Y02P 20/52* (2015.11)

(58) Field of Classification Search
CPC ......... C01B 3/16; B01J 21/04; B01J 23/8871; B01J 23/8872; B01J 35/002; B01J 35/0026; B01J 35/023; B01J 35/026; B01J 35/1014; B01J 35/1019; B01J 35/1038; B01J 35/1042; B01J 37/0201; B01J 37/04; B01J 37/20
See application file for complete search history.

(56) References Cited

U.S. PATENT DOCUMENTS

| | | |
|---|---|---|
| 2,784,162 A | 3/1957 | Myers et al. |
| 3,898,180 A | 8/1975 | Crooks |
| 4,260,524 A | 4/1981 | Nakazato |
| 4,366,093 A | 12/1982 | Shiozaki |

(Continued)

FOREIGN PATENT DOCUMENTS

WO    WO-2012171933 A1 * 12/2012 ............ Y02P 20/584

*Primary Examiner* — Melvin C. Mayes
*Assistant Examiner* — Michael Forrest (57) ABSTRACT

The disclosure provides catalyst materials in the form of annular solids with high mechanical integrity useful for water gas shift reactions and methods for using such catalyst materials, for example, for converting carbon monoxide and steam to carbon dioxide and hydrogen.

21 Claims, 4 Drawing Sheets

(56) References Cited

U.S. PATENT DOCUMENTS

| | | | | |
|---|---|---|---|---|
| 4,441,990 A | * | 4/1984 | Huang | B01J 29/40 |
| | | | | 208/111.15 |
| 4,510,263 A | * | 4/1985 | Pereira | C10G 45/08 |
| | | | | 502/314 |
| 4,656,157 A | | 4/1987 | Hofmann | |
| 5,371,277 A | * | 12/1994 | Matsumoto | B01J 23/40 |
| | | | | 502/439 |
| 6,518,220 B2 | | 2/2003 | Walsdorff | |
| 7,387,699 B2 | | 6/2008 | Ideno | |
| 8,563,460 B2 | | 10/2013 | Birdsall | |
| 8,846,564 B2 | | 9/2014 | Wang | |
| 2001/0029235 A1 | * | 10/2001 | Walsdorff | B01J 19/30 |
| | | | | 502/346 |
| 2002/0147103 A1 | * | 10/2002 | Ruettinger | B01J 23/56 |
| | | | | 502/66 |
| 2003/0187305 A1 | * | 10/2003 | Petzoldt | B01J 23/002 |
| | | | | 568/479 |
| 2004/0043900 A1 | | 3/2004 | Combs | |
| 2006/0216227 A1 | * | 9/2006 | Idem | B01J 21/066 |
| | | | | 423/651 |
| 2011/0201494 A1 | * | 8/2011 | Birdsall | B01J 23/755 |
| | | | | 502/170 |
| 2012/0283088 A1 | | 11/2012 | Fischer | |
| 2014/0138586 A1 | * | 5/2014 | Meese-Marktscheffel | |
| | | | | B01J 23/882 |
| | | | | 252/373 |

\* cited by examiner

SHAPED CATALYST FOR SOUR GAS SHIFT REACTIONS AND METHODS FOR USING THEM

BACKGROUND OF THE INVENTION

Field of the Invention

The disclosure provides shaped catalyst materials useful for the sour gas shift reactions and methods for using such catalyst materials.

Description of Related Art

Synthesis gas, also termed syngas, is generally composed of hydrogen and carbon oxides (CO and $CO_2$) and is an important feedstock in the chemical and energy industries. It may be generated by gasification of carbonaceous feedstocks such as coal, petroleum coke or other carbon-rich feedstocks using oxygen or air and steam at elevated temperature and pressure. Gasification alone can provide an undesirably high ratio of CO to $H_2$. To remedy this, the water-gas shift reaction:

$$H_2O+CO \rightarrow H_2+CO_2$$

can be used to decrease the ratio of CO to $H_2$. Specialized catalysts, such as copper-based catalysts, iron-based catalysts and nickel-based catalysts, are typically used in the water gas shift reaction. However, when the synthesis gas is contaminated with one or more sulfur compounds, as is common when coal-based feedstocks are used, such catalysts can become inactivated. Accordingly, sulfur-tolerant shift catalysts have been developed, based on, for example, cobalt and molybdenum. When the water-gas shift reaction is performed in the presence of sulfur impurities, it is known as a "sour gas shift". Sour gas shift reactions are generally exothermic, and are conventionally allowed to run adiabatically, with control of the exit temperature governed by feed gas inlet temperature and composition. With an increase in temperature, however, undesirable side reactions can occur, particularly methanation. Moreover, unsafe reaction conditions and the possibility of catastrophic reaction runaway increase with increasing temperature. The problem of exothermicity is especially important in cases where the inlet gas stream has a high CO concentration. But more and more technologies used for gasification generate high CO concentration (over 60%), well over the 40% CO concentration at which typical industrial sour gas shift reactions run manageably and safely. To avoid side reactions and unsafe operation, the shift reaction is typically performed with considerable amounts of added steam. However, such steam addition can complicate reaction processes, and may require catalysts with improved characteristics, such as increased geometric surface area, improved diffusion efficiency, enhanced heat transfer and reduced pressure drop.

These characteristics may be achieved with a hollow shaped catalyst. But hollow shaped catalysts typically suffer from decreased mechanical integrity and stability, which are essential for use in large scale reactors. A hollow shaped catalyst with insufficient mechanical integrity is not generally useful in industrial processes even if its performance characteristics are otherwise superior. Currently, there are no commercially-available hollow shaped catalysts having the mechanical integrity and stability necessary for the high-steam conditions of an industrial-scale water gas shift process.

SUMMARY OF THE INVENTION

In one aspect, the present invention provides a catalyst material formed as an annular solid. The annular solid has a cross-sectional shape having a lateral outer surface;

a hole in the annular solid, the hole defining a lateral inner surface of the annular solid, the lateral outer surface and the lateral inner surface defining an annular wall, wherein the annular wall has a minimum thickness of at least 1.0 mm;

an average width in the range of about 3.3 mm to about 15 mm as measured through the geometrical center of the cross-sectional shape of the solid; and a length measured in a direction parallel to the hole, the length being in the range of about 2 mm to about 30 mm;

wherein the minimum ratio of wall thickness to width measured along the line of the wall thickness is at least about 0.3.

In certain embodiments as described herein, the catalyst material includes a carrier material selected from aluminum oxide, silicon oxide, magnesium oxide, manganese oxide, zirconium oxide, titanium oxide, metal aluminate and combinations thereof.

In certain embodiments as described herein, the catalyst material includes a carrier material selected from aluminum oxide, silicon oxide, magnesium oxide, manganese oxide, zirconium oxide, titanium oxide, metal aluminate and combinations thereof; and one or more catalytically-active metals each selected from alkali metals, alkaline-earth metals, transition metals and lanthanide metals.

In another aspect, the present invention provides a method for converting carbon monoxide and steam to carbon dioxide and hydrogen, the method comprising reacting a carbon monoxide-containing feed gas with steam in contact with a catalyst material as described herein.

In another aspect, the present invention provides a method for converting carbon monoxide and steam to carbon dioxide and hydrogen, the method including sulfiding a catalyst material as described herein to provide a sulfided catalyst material; and reacting a carbon monoxide-containing feed gas with steam in contact with the sulfided catalyst material.

DETAILED DESCRIPTION OF THE INVENTION

Before the disclosed methods and materials are described, it is to be understood that the aspects described herein are not limited to specific embodiments, apparati, or configurations, and as such can, of course, vary. It is also to be understood that the terminology used herein is for the purpose of describing particular aspects only and, unless specifically defined herein, is not intended to be limiting.

Throughout this specification, unless the context requires otherwise, the word "comprise" and "include" and variations (e.g., "comprises," "comprising," "includes," "including") will be understood to imply the inclusion of a stated component, feature, element, or step or group of components, features, elements or steps but not the exclusion of any other integer or step or group of integers or steps.

As used in the specification and the appended claims, the singular forms "a," "an" and "the" include plural referents unless the context clearly dictates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein the term "contacting" includes the physical contact of at least one substance to another substance.

All percentages, ratios and proportions herein are by weight, unless otherwise specified. A weight percent (weight %, also as wt %) of a component, unless specifically stated to the contrary, is based on the total weight of the formulation or composition in which the component is included (e.g., on the total amount of the shift catalyst). Unless otherwise specified, all weight percent values are calculated as the most stable oxide. All mol % values are based on the moles of metal atoms.

In view of the present disclosure, the methods and active materials described herein can be configured by the person of ordinary skill in the art to meet the desired need. In general, the disclosed materials, methods, and apparati provide improvements in supports or carriers utilized in the production and use of synthesis gas and in other gasification-related technologies, particularly in the sour gas shift process. For example, in certain aspects, the catalysts of the disclosure have higher mechanical stability and/or resistance to attrition than commercial materials. In certain aspects, the catalysts of the disclosure have low methanation activity, high thermal stability and/or low production cost. In certain aspects, the catalysts of the disclosure are highly stable and insensitive to changes in temperature, steam/gas ratio, and space velocity.

In one aspect, the present invention provides a catalyst material in the shape of an annular solid. As the person of ordinary skill in the art, the annular solid may be formed in a variety of overall form factors, for example, as an annular cylinder, an annular pellet or an annular tablet. It can, for example, be fluted, and the end faces can be flat, or shaped (e.g., curved, round, beveled, chamfered or otherwise). As described in more detail below, the catalyst materials described herein may be useful as a catalyst in a sour gas shift reaction.

Figure 1:
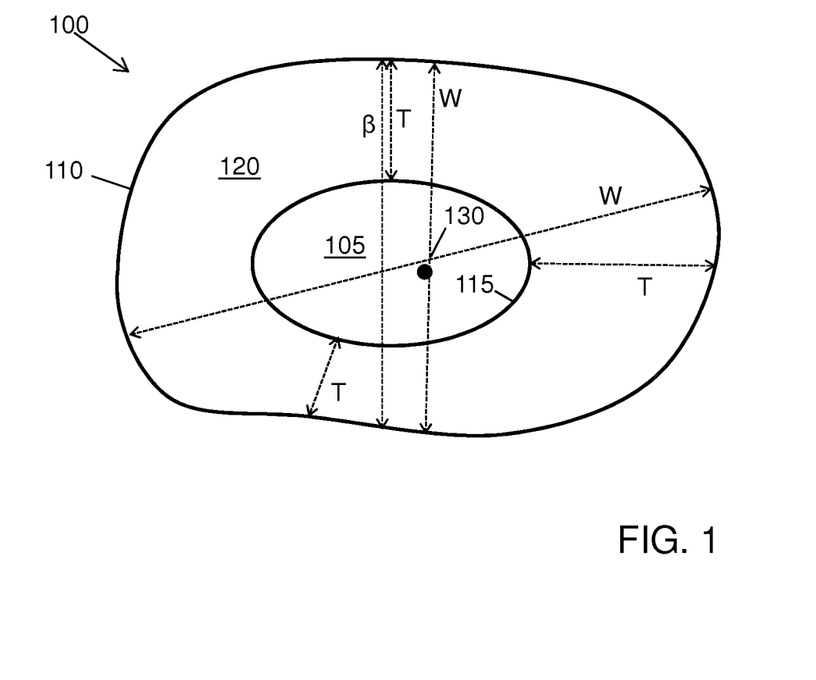
FIG. 1 is a schematic cross-sectional view of a catalyst material according to one embodiment described herein.
Figure 2:
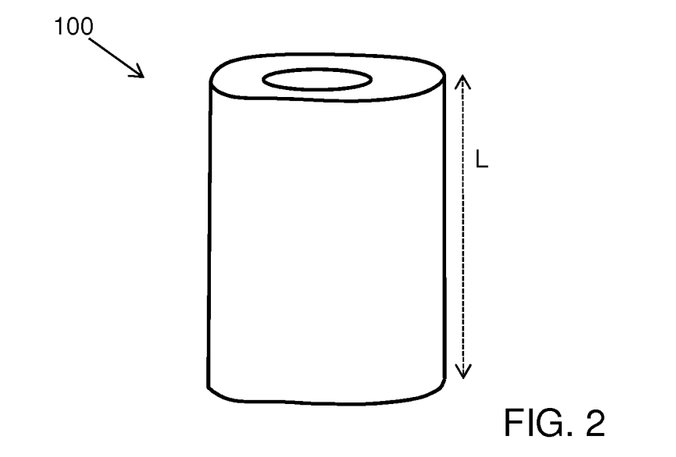
FIG. 2 is a schematic perspective view of the catalyst material of FIG. 1.

One example of a catalyst material is shown in schematic cross-sectional view in FIG. 1, and in schematic perspective view in FIG. 2. Catalyst material 100 is formed as an annular solid. In cross-section, the annular solid has a lateral outer surface 110. A hole 105 formed through the annular solid defines a lateral inner surface 115 thereof. The lateral outer surface and the lateral inner surface define an annular wall 120. At any point along the lateral inner surface 115 the annular wall 120 has a thickness T; FIG. 1 shows the thickness T at a variety of locations along the annular wall 120. The minimum thickness of the annular wall 120 is at least 1.0 mm (i.e., at all locations along the annular wall). The annular solid also has a variety of widths W, each measured through the geometrical center of a cross-section of the annular solid (indicated by reference numeral 130 in FIG. 1; the person of skill in the art will appreciate that the geometrical center may or may not be within the hole). The average width (i.e., averaged over all radial directions) is in the range of about 3.3 mm to about 15 mm. The annular solid also has a length L, measured in a direction parallel to the hole from one end of the annular solid to the other (as shown in FIG. 2). The length is in the range of about 2 mm to about 20 mm. Moreover, the minimum ratio of wall thickness (T) to the width as measured along the same line as the wall thickness ($\beta$) is at least about 0.3. A value of T and an associated value of $\beta$ can be measured at all locations along the annular wall. As the person of ordinary skill in the art would recognize, depending on the cross-sectional shape of the solid and the location at which T and $\beta$ are measured, $\beta$ may or may not be the same as W as measured at a similar location. As described in more detail the inventors have determined that this combination of parameters provides not only good mechanical integrity but also high geometric surface area (GSA), high diffusion efficiency and low pressure drop. In certain particular embodiments, the average width is in the range of about 5 mm to about 15 mm, and the minimum thickness of the annular wall is at least 1.5 mm. In other particular embodiments, the average width is in the range of about 3.3 mm to about 10 mm, and the minimum thickness of the annular wall is at least 1.0 mm.

As the person of ordinary skill in the art will appreciate, the catalyst material may be made from a variety of materials, many of which are known in the art and conventional for use in the water gas shift reaction. For example, catalyst material may include a carrier material. In some embodiments, the catalyst material may also include a catalytically-active metal (in any desired oxidation state). The catalytically-active metal may be disposed on, or in an admixture with, the carrier material. As described in more detail herein, and in U.S. patent application Ser. No. 14/088,526, which is hereby incorporated herein by reference in its entirety, such catalyst materials can in certain embodiments be made with relatively low activity, and as such can be used in sour gas shift processes with high levels of CO in the input stream without causing undue increases in process temperature. Accordingly, in certain aspects, processes using the catalysts described herein can enjoy the advantages of relatively low levels of methanation side reaction and/or increased catalyst lifetime.

Figure 3:
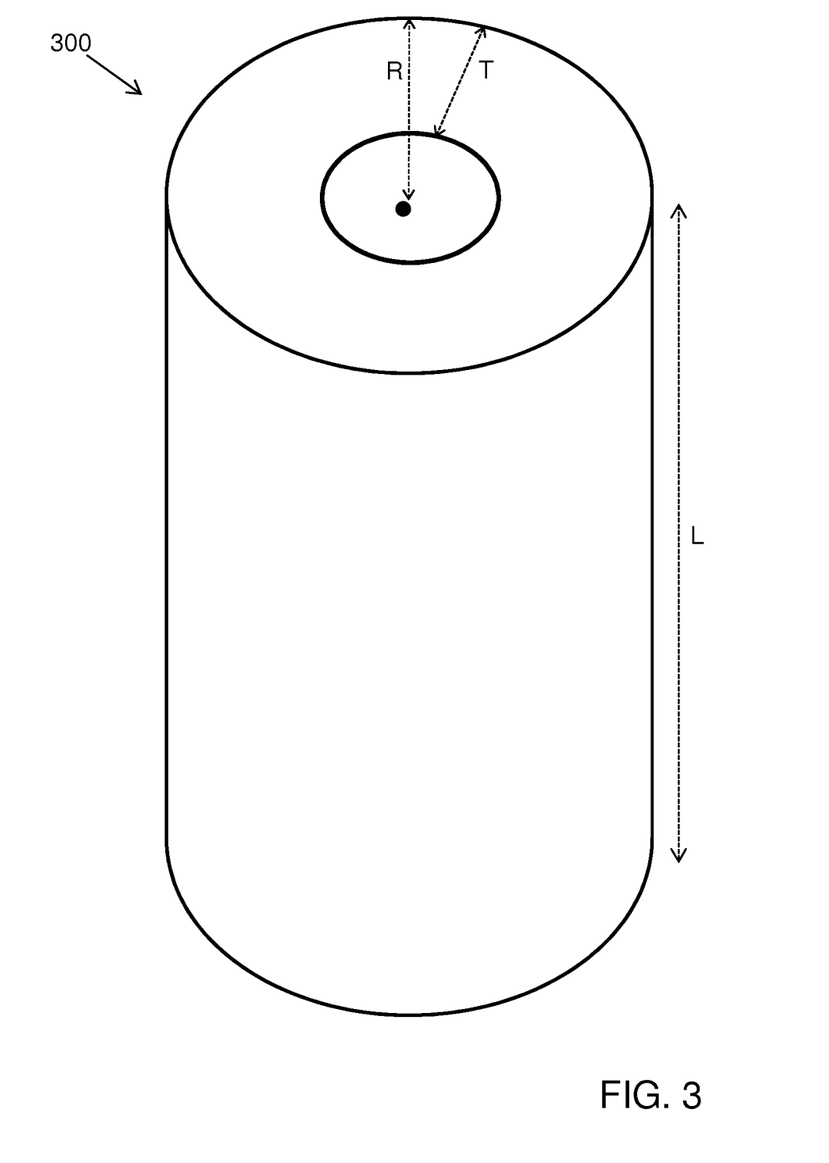
FIG. 3 is a schematic perspective view of a catalyst material according to another embodiment described herein.

As the person of ordinary skill in the art will appreciate, within the variables described above the catalyst material can be formed in a variety of shapes. For example, in one embodiment, the catalyst material may be in the shape of an annular cylinder as shown in FIG. 3. The person of ordinary skill will appreciate that annular cylinder may be substantially cylindrical. The annular cylinder 300 of FIG. 3 has a length (L), a radius (R) and a wall thickness (T). The radius is measured from the center point of a cross-section of the annular cylinder (indicated by reference numeral 330) to the outer surface. In the circularly symmetrical case, T is measured along R, W is 2R and $\beta$ is 2R. Of course, in cases where the hole is off-center, the geometrical analysis described with respect to FIGS. 1 and 2 can be used to determine the various lengths, widths and thicknesses. In some embodiments, the annular cylinder has a width (2R) of about 3.3 mm to about 15 mm;
a length (L) of about 2 mm to about 30 mm;
a thickness (T) of greater than or equal to 1.0 mm; and the ratio of wall thickness to external diameter (T/2R) is greater than or equal to 0.3.

As the person of ordinary skill in the art will appreciate, the external shape of the catalyst need not be cylindrical. Catalyst materials according to various embodiments of the disclosure can have a variety of cross-sectional shapes, e.g., circular, oval, elliptical, polygonal (e.g., quadrilateral, triangular), and more complex shapes. For any general shape, the geometrical analysis described with respect to FIGS. 1 and 2 can be used to determine the various lengths, widths and thicknesses. Particular examples are further described herein.

Figure 4:
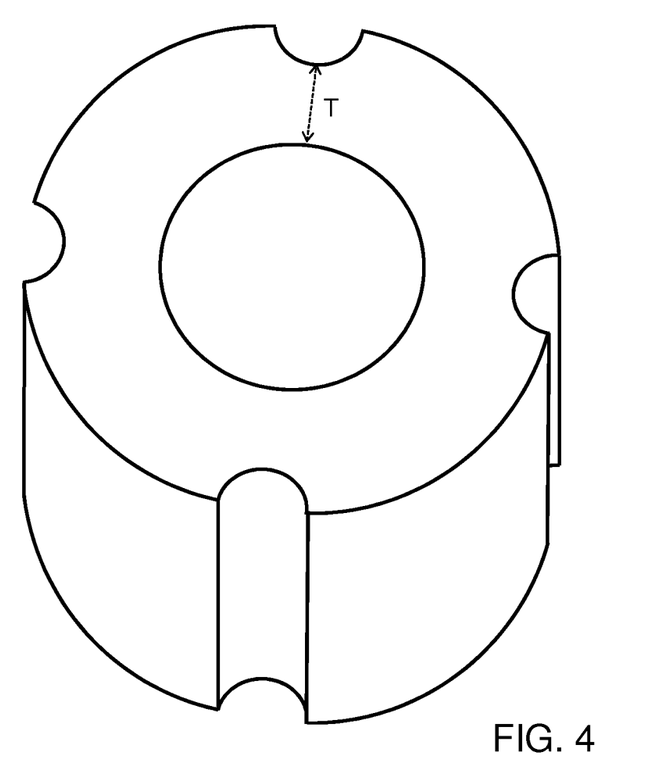
FIG. 4 is a schematic perspective view of a catalyst material according to another embodiment described herein.

In certain embodiments, the annular solid includes indentations or protrusions in its lateral outer surface. Such features can be used to advantageously adjust the theoretical geometric surface area (GSA) of the annular solid, and as such may affect the performance of the performance of the catalyst in the water-gas shift reaction. For example, as shown in the embodiment of FIG. 4, the lateral outer surface can be fluted. In such cases, the minimum wall thickness will often be measured from the innermost point of the flute to the inner surface of the annular solid, as indicated by the arrow marked "T". The flutes may in certain embodiments be substantially semicircular and/or substantially equidistant from each other along the outer surface of the annular solid. In some embodiments, the annular solid includes 1, 2, 3, 4, 5, 6, 7 or 8 flutes. In certain embodiments the annular solid includes three flutes, while in other embodiments the annular solid includes four flutes. Of course, the person of ordinary skill in the art will appreciate that the annular solid may include indentations or protrusions of different shapes. While in certain embodiments the annular protrusions may run along the entire length of the annular solid (e.g., parallel to the hole), in other embodiments they may not.

Figure 5:
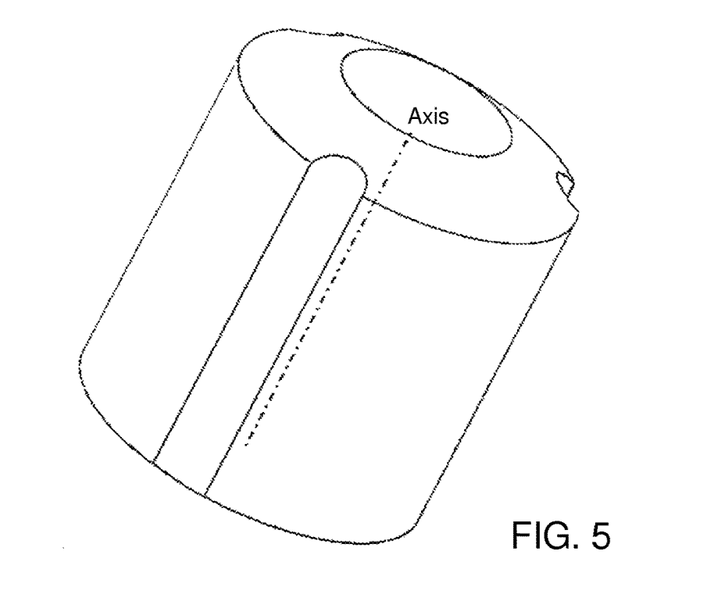
FIG. 5 is a schematic perspective view of a catalyst material according to another embodiment described herein.
Figure 6:
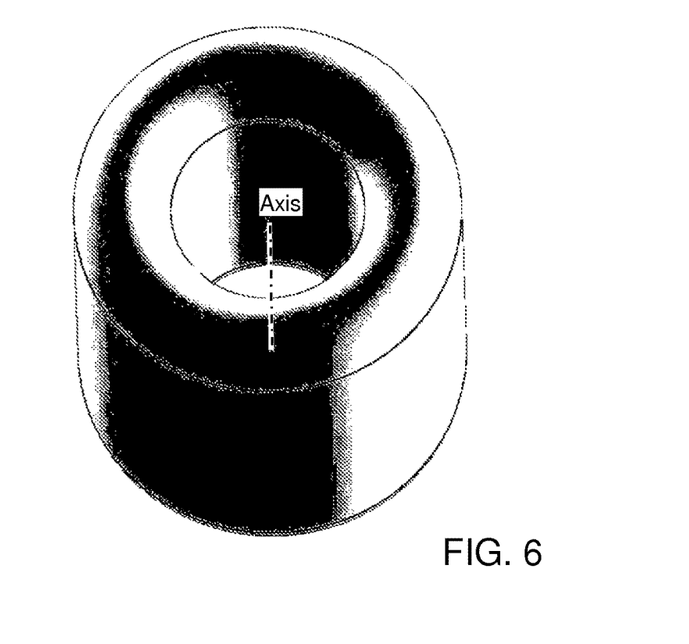
FIG. 6 is a schematic perspective view of a catalyst material according to another embodiment described herein.

In the embodiments of FIGS. 1-3, the ends of the annular solid are shown as being flat, formed generally perpendicular to the axis of the hole. Of course, in other embodiments, the ends of the annular solid may have a different shape, for example, to adjust the theoretical geometric surface area of the catalyst material, and thereby affect the performance of the catalyst. In some embodiments, one, or both, ends of the annular solid are substantially flat. In certain embodiments, the flat ends are substantially perpendicular to the axis of the hole. In other embodiments, they are formed at an angle to perpendicular, e.g., 0-45°, or 0-20°. In other embodiments, the ends of the annular solid are substantially beveled, e.g., such that the inner and outer walls of the annular solid have substantially unequal lengths. For example, the lateral inner surface may be longer than the lateral outer surface, or the lateral outer surface may be longer than the inner wall. Such an embodiment is shown in FIG. 5. In other embodiments, the one, or both, ends of the annular solid protrude from the ends of the lateral inner and outer surfaces, e.g., the lateral inner and outer surfaces of the annular solid may be substantially the same length, but the end of protrudes beyond them. An example is shown in FIG. 6. The protrusion may be rounded, or may come to a point, or may form a plateau. In certain embodiments, the two ends of the annular solid are not symmetrical. For example, the annular solid may have one flat end and one protruding end.

As described above, the length of the annular solid is in the range of about 2 mm to about 30 mm. With this range, the length can be, for example, at least about 3 mm, at least about 4 mm, at least about 5 mm, at least about 6 mm, or even at least about 10 mm. Within the ranges described above, the length can be, for example, no more than 30 mm, no more than 18 mm, no more than 15 mm, no more than 12 mm, no more than 10 mm, no more than 8 mm, or even no more than 6 mm. For example, in certain particular embodiments, the length can be about 2 mm to about 20 mm, about to 2 mm to about 10 mm, or about 2 mm to about 8 mm, or about 4 mm to about 10 mm, or about 4 mm to about 8 mm, or about 4 mm to about 6 mm. In other embodiments, the length is about 3 mm to about 10 mm, or about 3 mm to about 8 mm, or 3 mm to about 6 mm. In other embodiments, the length is about 4.5 mm to about 6.5 mm. In some embodiments, the length is about 10 mm to about 30 mm or about 10 mm to about 20 mm. The length can be about to 12 mm to about 20 mm, or about 12 mm to about 18 mm, or about 14 mm to about 20 mm, or about 10 mm to about 16 mm, or about 10 mm to about 14 mm.

As described above, the annular solid has an average width (i.e., averaged over all radial directions) in the range of about 3.3 mm to about 15 mm. In certain embodiments, the average width is about 3.3 mm to about 10 mm. The average width can be, for example, about to 3.3 mm to about 8 mm, or about 3.3 mm to about 6 mm, or about 4 mm to about 15 mm, or about 4.0 mm to about 10 mm, or about 4.0 mm to about 8.0 mm, or about 5 mm to about 15 mm, or about 5 mm to about 10 mm. In certain embodiments, the average width is about 3.3 mm to about 7.0 mm. In other embodiments, the average width is about 4 mm to about 6 mm, or about 5 mm to about 8 mm.

In certain embodiments, the minimum width (i.e., in all directions) of the cross-sectional shape of the annular solid is at least about 2 mm, at least about 3 mm, at least about 4 mm, at least about 5 mm, or even at least about 6 mm.

As described above, the minimum thickness of the annular wall is at least 1.0 mm. In certain embodiments, the minimum thickness of the annular wall is at least 1.5 mm. The minimum wall thickness may, for example, at least 1.6 mm, or at least 1.7 mm, or at least 1.8 mm, or at least 1.9 mm, or at least 2 mm, or at least 3 mm.

In certain embodiments as described above, the average thickness of the annular wall is no more than about 4 mm, no more than about 3 mm, no more than about 2.5 mm, or even no more than about 2 mm.

In certain embodiments as described above, the maximum thickness of the annular wall is no more than about 8 mm, no more than about 6 mm, no more than about 4 mm, no more than about 3 mm, no more than about 2.5 mm, or even no more than about 2 mm.

In some embodiments, the wall thickness is about 1.4 mm to about 2.5 mm or about 1.5 mm to about 2.0 mm. In other embodiments, the wall thickness is about 1.5 mm to about 1.9 mm, or about 1.6 mm to about 1.9 mm, or about 1.7 to about 1.9 mm, or about 1.5 mm to about 1.8 mm, or about 1.5 mm to about 1.7 mm, or about 1.5 to about 1.6 mm, or about 1.7 mm to about 1.9 mm, or about 1.8 mm to about 1.9 mm, or about 1.6 mm to about 1.8 mm, or about 1.6 mm to about 1.7 mm, or about 1.7 to about 1.8 mm.

As described above, the minimum ratio of wall thickness (T) to width measured along the line of the wall thickness ($\beta$) is at least about 0.3 (i.e., the ratio is at least about 0.3 at all locations along the wall). The minimum ratio can be, for example, at least about 0.325, or at least about 0.35, or at least about 0.375, or at least about 0.4. In some embodiments, the minimum ratio is in range of about 0.3 to about 0.5, or about 0.3 to about 0.475, or about 0.3 to about 0.45, or about 0.3 to about 0.425, or about 0.325 to about 0.5, or about 0.35 to about 0.5, or about 0.375 to about 0.5, or about 0.35 to about 0.45. In other embodiments, the minimum ratio is about 0.3 to about 0.4.

In certain embodiments, the average ratio of wall thickness (T) to width measured along the line of the wall thickness (β) is in the range of 0.3 to 0.45, (i.e., the average over locations along the wall). In other embodiments, the average ratio of wall thickness (T) to width measured along the line of the wall thickness (β) is in the range of about 0.3 to about 0.475, or about 0.3 to about 0.45, or about 0.3 to about 0.425, or about 0.325 to about 0.5, or about 0.35 to about 0.5, or about 0.375 to about 0.5, or about 0.35 to about 0.45. In other embodiments, the average ratio of wall thickness (T) to width measured along the line of the wall thickness (β) is about 0.3 to about 0.4.

As the person of ordinary skill in the art will appreciate, the ratio of wall thickness to width measured along the line of the wall thickness can be substantially uniform (e.g., for a cylindrical annular solid with a substantially centered hole), or can vary significantly at different locations along the annular wall (e.g., in shapes that are not radially symmetric and/or with non-centered holes). The hole can be formed in many different shapes, and can be centered or not centered, as would be apparent to the person of ordinary skill in the art. In certain embodiments, the hole has an average diameter (i.e., averaged over all directions, as measured through the geometrical center of the hole cross-section) of at least about 1 mm, at least about 1.5 mm, at least about 2 mm, or even at least about 3 mm. Of course, the size of the hole should be such that other desired geometrical considerations are maintained.

The annular solid can be substantially uniform in cross section (e.g., excepting the ends), or can vary in cross-section. In certain embodiments, the cross-sectional shape of the annular solid has the above-described geometrical characteristics over at least about 50%, over at least about 75%, over at least about 85%, over at least about 90%, or even over at least about 95% of its length.

In one aspect, the catalyst material includes a carrier. The carrier material may be selected from, for example, aluminum oxide, silicon oxide, magnesium oxide, manganese oxide, zirconium oxide, titanium oxide, metal aluminate and combinations thereof. For example, the carrier material can be aluminum-titanium oxide, aluminum-lanthanum/cerium oxide, or aluminum-magnesium oxide. In some embodiments, the carrier material can be aluminum oxide, magnesium oxide, magnesium aluminate, or a mixture thereof. The amounts of the carrier materials are calculated as the most stable oxide for each carrier (e.g., aluminum as $Al_2O_3$, magnesium oxide as MgO).

In certain such embodiments, the carrier material is at least about 70 weight %, at least about 80 weight %, at least about 90 weight %, or at least about 95 weight % of the catalyst material. In one embodiment, the catalyst material consists essentially of the carrier material; in certain such embodiments, the catalyst material can be later impregnated with a catalytic metal species.

The person of ordinary skill in the art will appreciate that in many embodiments, the catalyst material will include one or more catalytically-active metal species and a carrier (e.g., as described above). In certain embodiments, the catalytically-active metal species (and, optionally, one or more promoters as discussed in greater detail below) are present at levels of up to about 30 weight % (e.g., up to about 20 weight %, up to about 15 weight %, for example, about 2 weight % to about 15 weight %) of the catalyst material (calculated as oxide), with the carrier material often substantially making up the remaining weight of the catalyst material.

In certain embodiments, the carrier material is substantially aluminum oxide, e.g., in the amounts described above. For example, the aluminum oxide can be present as at least about 90 weight % of the carrier material. In some embodiments, the aluminum oxide is present in a range of about 75 weight % to about 90 weight % of the carrier material.

In other embodiments, the carrier material is substantially a mixture of aluminum oxide and magnesium oxide, e.g., in a total amount as described above. In these mixtures, the magnesium oxide can be present, for example, in a range of about 5 weight % to about 30 weight % of the carrier material. In particular embodiments, the magnesium oxide may be present in a range of about 10 weight % to about 20 weight % of the carrier material. Also, where the carrier material is substantially a mixture of aluminum oxide and magnesium oxide, the weight ratio of the aluminum oxide to the magnesium oxide can be, for example, at least about 5:1. In some embodiments, the weight ratio of the aluminum oxide to the magnesium oxide is in the range of about 4:1 to about 6:1.

In some embodiments, the carrier material is substantially a mixture of aluminum oxide and titanium oxide. In these mixtures, the titanium oxide can be present in a range of about 5 weight % to about 30 weight % of the carrier material. In particular embodiments, the titanium oxide may be present in a range of about 10 weight % to about 20 weight % of the carrier material. Also, where the carrier material is substantially a mixture of aluminum oxide and magnesium oxide, the weight ratio of the aluminum oxide to the titanium oxide can be, for example, at least about 5:1. In some embodiments, the weight ratio of the aluminum oxide to the titanium oxide is in the range of about 4:1 to about 6:1.

As noted above, in many embodiments, the catalyst material further comprises one or more catalytically-active metal species, which may be independently selected from alkali metal species, alkaline-earth metal species, transition metal species and lanthanide metal species. The catalytically-active metal species can be present in any oxidation state (i.e., in a zero valence state as a "metal", or in a positive oxidation state, for example, as a metal oxide, metal sulfide, metal nitride or a combination thereof. The catalytically-active metal species can be present, for example, at levels of up to about 30 weight % (e.g., up to about 20 weight %, up to about 15 weight %) of the catalyst material (calculated as oxide). The catalytically-active metal species may be present, for example, at a level of about 2 weight % to about 15 weight % of the catalyst material, calculated as oxide. In other embodiments, the catalytically-active metal, can be present in a range of about 5 weight % to about 10 weight %, of about 6 weight % to about 9 weight %, of about 6 weight % to about 7 weight %, or of about 7 weight % to about 8 weight % of the catalyst material, calculated as oxide. In other embodiments, the catalytically-active metal is present at a level of about 2 weight % to about 10 weight %, or about 3 weight % to about 10 weight %, or about 4 weight % to about 15 weight %, or about 2 weight % to about 20 weight %, or about 4 weight % to about 20 weight %, or about 3 weight % to about 30 weight %.

In some embodiments, the catalytically-active metal species includes an alkali metal species, such as, for example, potassium, rubidium or cesium species. Amounts of alkali metal species are calculated as alkali oxide (i.e., $M_2O$).

In some embodiments, the catalytically-active metal species includes an alkaline-earth metal species, such as, for example, beryllium, magnesium, calcium, strontium or barium species. Amounts of alkaline earth metal species are calculated as alkaline earth oxide (i.e., MO).

In some embodiments, the catalytically-active metal species includes a transition metal species. The transition metal may be a precious metal species, such as a gold, silver, platinum or palladium species. Other suitable transition metal species include, but are not limited to ruthenium, rhodium, osmium, iridium, scandium, titanium, vanadium, chromium, manganese, iron, cobalt, nickel, copper, zinc, yttrium, zirconium, molybdenum, ruthenium, cadmium, hafnium, tantalum, tungsten, and rhenium species. The transition metal species can be present in any oxidation state. Unless otherwise indicated herein, amounts of transition metal species are calculated as the most stable oxide.

In some embodiments, the catalytically-active metal species includes a lanthanide metal species. Suitable lanthanide metal species include, but are not limited to lanthanum, cerium, samarium and ytterbium species. The lanthanide metal species can be present in any oxidation state. Unless otherwise indicated herein, amounts of lanthanide metal species are calculated as the most stable oxide.

In some embodiments, the catalytically-active metal species includes molybdenum, for example, in the amounts described above. The catalytically-active molybdenum species can be present, for example, in a range of about 2 weight % to about 15 weight %, calculated as $MoO_3$. In other embodiments, the catalytically-active molybdenum species, can be present in a range of about 5 weight % to about 15 weight %, or about 6 weight % to about 10 weight %, or about 6 weight % to about 8 weight %, or about 7 weight % to about 8 weight % of the catalyst material, calculated as $MoO_3$.

In some embodiments, the catalytically-active metal species includes cobalt, for example, in the amounts described above. The catalytically-active cobalt species can be present, for example, in a range of about 0.5 weight % to about 6 weight %, calculated as oxide. In other embodiments, the catalytically-active cobalt species, can be present in a range of about 0.5 weight % to about 4 weight %, or about 1 weight % to about 3 weight %, or about 2 weight % to about 4 weight %, or about 2 weight % to about 3 weight %, or about 3 weight % to about 4 weight % of the catalyst material, calculated as CoO.

As the person of ordinary skill in the art will appreciate, the catalytically-active molybdenum species can be provided in a variety of forms. For example, in certain embodiments, the catalytically-active molybdenum species may be a molybdenum (VI) species, or a molybdenum (V) species, or a molybdenum (IV) species. In certain embodiments, the catalytically-active molybdenum species is provided as molybdenum oxide; for example, molybdenum (VI) oxide (e.g., $MoO_3$). Of course, the person of ordinary skill in the art will appreciate that a variety of catalytically-active molybdenum species may be present, especially after a catalyst material is sulfided for use in a sour gas shift process. And as the person of skill in the art will appreciate, the molybdenum species can be provided as a mixture of molybdenum species. As used herein, amounts of molybdenum species are calculated as $MoO_3$.

Similarly, the catalytically-active cobalt species can be provided in a variety of forms. For example, the catalytically-active cobalt species may be a cobalt (II) species, or a cobalt (III) species. In certain embodiments, the catalytically-active cobalt species is provided as cobalt oxide; for example, cobalt (II) oxide (e.g., CoO). Of course, the person of ordinary skill in the art will appreciate that a variety of catalytically-active cobalt species may be present, especially after a catalyst material is sulfided for use in a sour gas shift process. And as the person of skill in the art will appreciate, the cobalt species can be provided as a mixture of cobalt species. As used herein, amounts of cobalt species are calculated as CoO.

In other embodiments, the catalytically-active metal includes nickel. The person of ordinary skill in the art will appreciate that the catalytically-active nickel species may be provided as a nickel (II) species, or a nickel (III) species, or a nickel (II,III) species; for example, as a nickel oxide. As used herein, amounts of the nickel species are calculated as NiO. The catalytically active nickel species can be present, for example, in a range up to about 1 weight % calculated as NiO. In certain embodiments, the catalytically-active nickel species is present in an amount up to about 0.5 weight %, up to about 0.2 weight % or up to about 0.1 weight % of the catalyst material, calculated as oxide. In other embodiments, the catalytically-active nickel species can be present, for example, in a range of about 0.5 weight % to about 7 weight %, calculated as oxide. In other embodiments, the catalytically-active nickel species, can be present in a range of about 0.5 weight % to about 5 weight %, or about 1 weight % to about 6 weight %, or about 2 weight % to about 4 weight %, or about 1 weight % to about 3 weight %, or about 3 weight % to about 5 weight % of the catalyst material, calculated as oxide.

In some embodiments, the catalytically-active metal includes tungsten, for example, in the amounts described above. The catalytically-active tungsten species can be present, for example, in a range of about 2 weight % to about 15 weight %, calculated as oxide. In other embodiments, the catalytically-active tungsten species, can be present in a range of about 5 weight % to about 15 weight %, or about 6 weight % to about 10 weight %, or about 6 weight % to about 8 weight %, or about 7 weight % to about 8 weight % of the catalyst material, calculated as oxide. Tungsten can be provided in a variety of oxidation states, but as used herein amounts of tungsten species are calculated as $WO_3$.

In certain embodiments, and especially for use in the water-gas shift reaction, the catalytically-active metal species can include one or more of molybdenum, cobalt, nickel and tungsten, e.g., in the amounts generally described above. For example, in certain embodiments, the catalytically-active metal species include cobalt and molybdenum; or nickel and molybdenum. In other embodiments, the catalytically-active metal species include cobalt and tungsten; or nickel and tungsten. In other embodiments, the catalytically-active metal species include nickel, cobalt and molybdenum, or nickel, cobalt and tungsten.

In some embodiments, the performance of the catalytically-active metal species can be modified by the presence of a promoter, as is common in the art. Accordingly, in certain embodiments of the catalyst materials as described herein, one or more metallic promoter species is present. Such metallic promoter species can be present, for example, in a range of up to about 1.5 weight %, up to about 1 weight %, up to about 0.5 weight %, up to about 0.2 weight %, up to about 0.1 weight %, or up to about 0.05 wt % of the catalyst material, calculated as the most stable oxide for each metal.

In certain such embodiments, the total amount of catalytically-active metal species (including, for example, molybdenum species and cobalt species and any other catalytically-active species present) together with any metallic promoter species is in the range of up to about 30 weight %, or up to about 20 weight %, or up to about 15 weight %, or about 2 weight % to about 20 weight %, or about 5 weight % to about 20 weight %, or about 2 weight % to about 15 weight %, or about 2 weight % to about 10 weight %, or about 5 weight % to about 15 weight %, or about 5 weight % to about 12 weight %, or about 7 weight % to about 15 weight %, or about 5 weight % to about 12 weight %, or about 10 weight % to about 15 weight %, or about 8 weight % to about 12 weight % of the catalyst material, calculated as oxide. The metallic promoter species are desirably provided in amounts that do not cause the activity of the catalyst material to increase to an undesirably high level. In certain embodiments of the catalyst materials described herein, each of the one or more metallic promoter species is an alkali metal, present, e.g., as an oxide.

For example, in some embodiments, the promoter is potassium. For example, the catalytically-active metal species may be Ni/Co—Mo oxide or potassium promoted Ni/Co—Mo oxide.

In other embodiments of the catalyst materials described herein, substantially no metallic promoter is present in the catalyst material. In certain embodiments of the catalyst materials described herein, substantially no alkali metal species is present in the catalyst material.

The catalyst materials described herein can be provided with a variety of different pore volumes, depending, e.g., on the methods used for making them and the desired end use. The pore volume of the catalyst material can be modified to obtain desirable performance in the water-gas shift reaction. In some embodiments, the catalyst material has a pore volume of about 0.2 to about 1.5 $cm^3/g$. In other embodiments, the pore volume can be about 0.4 to about 1.5 $cm^3/g$, 0.6 to about 1.5 $cm^3/g$, 0.8 to about 1.5 $cm^3/g$, about 1.0 to about 1.5 $cm^3/g$, about 1.2 to about 1.5 $cm^3/g$, about 0.2 to about 1.3 $cm^3/g$, about 0.2 to about 1.0 $cm^3/g$, about 0.2 to about 0.8 $cm^3/g$, about 0.2 to about 0.6 $cm^3/g$, about 0.5 to about 1.5 $cm^3/g$, about 0.5 to about 1.0 $cm^3/g$, about 0.4 to about 1.3 $cm^3/g$, or about 0.6 to about 0.9 $cm^3/g$. In some embodiments, the catalyst material has a pore volume of about 0.3 to about 0.7 $cm^3/g$. The person of ordinary skill in the art can, in view of the methods described herein, provide a desired pore volume to a catalyst material.

Similarly, the catalyst materials described herein can be provided with a variety of different surface areas, depending, e.g., on the methods used for making them and the desired end use. The surface areas are measured using the Brunauer-Emmett-Teller (BET) Surface Area method. The surface area of the catalyst material can be modified to obtain desirable performance in the water-gas shift reaction. The catalyst material can have a surface area in the range of about 50 $m^2/g$ to about 400 $m^2/g$. In some embodiments, the surface area may be in the range of about 50 $m^2/g$ to about 300 $m^2/g$, about 50 $m^2/g$ to about 200 $m^2/g$, about 50 $m^2/g$ to about 150 $m^2/g$, about 100 $m^2/g$ to about 400 $m^2/g$, about 150 $m^2/g$ to about 350 $m^2/g$, about 200 $m^2/g$ to about 400 $m^2/g$, about 200 $m^2/g$ to about 400 $m^2/g$, about 250 $m^2/g$ to about 400 $m^2/g$, or about 250 $m^2/g$ to about 350 $m^2/g$. In other embodiments, the surface area may be in the range of about 100 $m^2/g$ to about 250 $m^2/g$ or about 200 $m^2/g$ to about 300 $m^2/g$. The person of ordinary skill in the art can, in view of the methods described herein, provide a desired surface area to a catalyst material.

Likewise, the catalyst materials described herein can be provided with a variety of different crush strengths, depending, e.g., on the methods used for making them and the desired end use. The catalyst material may have sufficient mechanical integrity for industrial application, as measured by crush strength. Side-to-side crush strength is measured along the diameter of the annular solid of the catalyst material, and may be at least 5 N/mm, and even at least 7 N/mm. End-to-end crush strength is measured along the length of the annular solid of the catalyst material (materials are cut to 5 mm for measurement), and may be greater or equal to 60 N/mm, and even at least 70 N/mm. The bulk crush strength may be greater than or equal to 0.8 MPa, or even greater than 1 MPa.

The crush strength can be measured using methods known in the art. For example, the side-to-side and end-to-end crush strength, can be measured using ASTM method D-6175, and the bulk crush strength can be measured using ASTM method 7084-4. The crush strength of the catalyst material can be modified by adjusting the annular wall thickness and ratio of annular wall thickness to width. The person of ordinary skill in the art can, in view of the methods described herein, provide a desired crush strength to a catalyst material.

In some embodiments, the catalyst material exhibits a side-to-side crush strength of greater than or equal to 5 N/mm. In some embodiments, the side-to-side crush strength of greater than or equal to 7 N/mm. In other embodiments, the side-to-side crush strength is about 5 N/mm to about 20 N/mm, or about 5 N/mm to about 15 N/mm, or about 10 N/mm to about 20 N/mm, or about 7 N/mm to about 17 N/mm, or about 8 N/mm to about 15 N/mm, or about 5 N/mm to about 10 N/mm.

In some embodiments, the catalyst material exhibits an end-to-end crush strength of greater than or equal to 60 N/mm. In some embodiments, the end-to-end crush strength is greater than or equal to 70 N/mm or is greater than or equal to 100 N/mm. In other embodiments, the end-to-end crush strength is about 60 N/mm to about 150 N/mm, or about 60 N/mm to about 120 N/mm, or about 60 N/mm to about 100 N/mm, or about 80 N/mm to about 150 N/mm, or about 80 N/mm to about 130 N/mm, or about 80 N/mm to about 110 N/mm, or about 100 N/mm to about 150 N/mm, or about 100 N/mm to about 120 N/mm.

In some embodiments, the catalyst material exhibits a bulk crush strength of greater than or equal to 0.7 MPa. In some embodiments, the bulk crush strength can be greater than or equal to 1.0 MPa. In other embodiments, the bulk crush strength is about 0.7 MPa to about 3.0 MPa, or about 0.7 MPa to about 2.7 MPa, or about 0.7 MPa to about 2.4 MPa, or about 0.7 MPa to about 2.2 MPa, or about 0.7 MPa to about 2.0 MPa, or about 0.7 MPa to about 1.8 MPa, or about 0.7 MPa to about 1.5 MPa, or about 0.7 MPa to about 1.2 MPa, or about 0.8 MPa to about 2.7 MPa, or about 0.8 MPa to about 2.2 MPa, or about 0.9 MPa to about 3.0 MPa, or about 0.9 MPa to about 2.7 MPa, or about 0.9 MPa to about 2.2 MPa, or about MPa to about 3.0 MPa, or about 1.0 MPa to about 2.7 MPa, or about 1.0 MPa to about 2.2 MPa.

In certain particularly advantageous embodiments, the catalyst material has a side crush strength of at least 7 N/mm, an end-to-end crush strength of at least 70 N, and a bulk crush strength of at least 1.0 MPa. The inventors have determined that the particular geometric considerations described herein can be used to provide such desirable mechanical properties.

When used as a catalyst in a sour gas shift reaction as described in more detail below, the catalyst materials described herein can be sulfided to provide active catalyst material, thus at least partially converting catalytic metallic oxide species to sulfided species (e.g., oxysulfide and sulfide species). As the person of ordinary skill will appreciate, such sulfided species are catalytically-active species as understood in the present disclosure. Accordingly, another aspect of the invention is a catalyst as described herein in sulfided form. The person of ordinary skill in the art can use conventional sulfidation processes to sulfide the catalyst materials described herein, thereby providing the catalyst materials in sulfided form. Catalyst materials as described herein (e.g., in which the catalytically-active species are in oxide form) can be sulfided in-situ in the shift reactor, or in a separate location (even in a separate facility). In the sulfidation process, a catalyst material is treated with a sulfur-containing gas, such as raw syngas, a mixture of hydrogen and hydrogen sulfide, a mixture of hydrogen and carbon disulfide, a mixture of hydrogen and a mercaptan, such as butyl mercaptan, or a mixture of hydrogen and thiophenic compounds, dimethylsulfides or dimethyldisulfides. Any sulfur-containing compound that can be converted to hydrogen sulfide in the presence of hydrogen can be used in the sulfidation process.

In addition, carrier gases (e.g., $N_2$ and hydrocarbons) can be blended into the feed stream. The sulfidation process generally takes several hours and occurs by means of passing a hydrogen sulfide mixture, or a mixture containing other sulfur compounds that can be converted to hydrogen sulfide in the presence of hydrogen, and carrier gases, if desired, over the precursor catalyst at a conventional space velocity. In some embodiments, the sulfidation process occurs at elevated temperature and pressure, wherein the temperature and/or pressure remains in a range of temperature/pressure for the duration of the sulfidation process. For example, sulfidation may be performed at a temperature within the range of about 250° C. and about 450° C., and/or at a pressure within the range of about 0.1 MPa to about 12 MPa. The person of ordinary skill in the art can, in view of the methods described herein, provide the desired conditions to provide a sulfided catalyst material.

The catalyst materials have been described herein with respect to the shape and the composition of a single annular solid. Of course, the person of ordinary skill in the art will appreciate that a catalyst material will generally be used as a collection of many, many such annular bodies. In certain embodiments, a catalyst that includes a plurality of distinct bodies includes at least about 80%, at least about 90%, at least about 95%, or even at least about 99% annular bodies having any combination of the characteristics as described herein.

The catalyst materials described herein can be made by conventional procedures, as would be evident to the person of ordinary skill in the art. For example, techniques such as co-dipping, sequential dipping, co-impregnation and sequential impregnation can be used to add the catalytic components to a preformed carrier. In such cases, the catalytic components are added in the form of water soluble salt solutions. For example, molybdenum and cobalt species can be added in the form of ammonium molybdate and ammonium cobaltate; upon calcination, these precursors yield the corresponding oxides. Nickel species can be added, for example, in the form of ammine carbonate solutions or nitrate solutions; here, too, the corresponding oxides result upon calcination. Alternatively, the catalytic components can be added to the carrier by conventional procedures using the desired metal oxides dissolved in aqueous ammonia solution. After dipping/impregnation, the material can be dried and calcined to convert the precursor metal species to their oxide forms.

The dipping and impregnation processes can be performed in a conventional manner. For example, the impregnation can be performed with excess precursor solution, at a temperature in the range of 5° C.-35° C., for a time in excess of 10 minutes (e.g., 20-40 min).

In certain embodiments, the catalyst materials described herein can be prepared in a stepwise manner. First, the carrier material is formed (e.g., via conventional techniques) and calcined, e.g., to convert any non-oxide precursor components to their oxide forms and allow any stabilizing oxides utilized to enter the carrier material. Following the dipping or impregnation of the catalytic components onto or in the carrier material, the material is dried (e.g., at 100° C.-140° C., using box drying, belt drying, or spray drying) and a second calcination is performed, e.g., at a temperature from about 300° C. to about 600° C. (for example, 520° C.-560° C.) to convert the salts and/or ammines of the precursor components into their oxide forms. Alternatively, a single calcination step (e.g., as described above) can be used to provide both the carrier and the catalytically-active components.

The components (e.g., carrier materials in the form of the annular solid) described herein can be shaped and formed into annular bodies using conventional methods. For example, the person of ordinary skill in the art can use conventional extrusion techniques (among others) to provide the catalyst materials having the geometrical considerations described herein.

The catalyst materials described herein can be useful in performing water gas shift reactions. Accordingly, another aspect of the invention is a method for converting carbon monoxide and steam to carbon dioxide and hydrogen, the method comprising reacting a carbon monoxide-containing feed gas with steam in contact with a catalyst as described herein. Such reaction can be performed using conventional water gas shift reaction apparati and techniques. In certain such embodiments, the water gas shift reaction is performed in the presence of sulfur impurities; in such cases, the reaction is commonly known as the sour gas shift reaction. In such cases, the method can include, for example, before contacting the catalyst material with the feed gas, sulfiding a catalyst material as described herein (e.g., in which the catalytically-active species are in oxide form) to provide the catalyst material in sulfided form. In certain embodiments of the catalyst materials described herein, the catalytically-active species are catalytically-active for a water gas shift reaction, e.g., a sour gas shift reaction.

Advantageously, the catalyst materials described herein can be used with feed gases having high concentrations of carbon monoxide, with a substantially reduced risk of temperature runaway and methanation side reaction. Accordingly, in certain embodiments of the methods as described herein, the carbon monoxide concentration in the feed gas is in the range of about 30% to about 90%, in the range of about 30% to about 70%, in the range of about 30% to about 50%, in the range of about 40% to about 90%, in the range of about 40% to about 80%, in the range of about 40% to about 60%, in the range of about 50% to about 90%, in the range of about 50% to about 80%, in the range of about 50% to about 70%, in the range of about 60% to about 90%, in the range of about 60% to about 80%, or in the range of about 60% to about 70%.

The water-gas shift reaction methods described herein can be performed at a variety of pressures and temperatures. For example, in certain embodiments, the reaction temperature can remain in the range of about 180° C. to about 550° C., in the range of about 250° C. to about 450° C., or even in the range of about 290° C. to about 400° C. In certain embodiments, the pressure of the feed gas is in the range of about 0.1 MPa to about 12 MPa, about 4 MPa to about 12 MPa, about 0.1 MPa to about 10 MPa, or about 4 to about 10 MPa. Of course, the person of ordinary skill in the art will understand that in certain embodiments and applications the temperatures and pressures may differ from those particularly described here.

The methods described herein can be performed at a wide variety of steam/gas ratios. For example, in one embodiment of the methods as described herein, the steam/gas ratio is in the range of about 0.1 to about 2.5 (vol/vol). In certain embodiments of the methods as described herein, the steam/gas ratio is in the range of about 0.2 to about 1.8; about 0.2 to about 2.5, about 0.5 to about 1.0, or about 0.1 to about 1.8. Of course, the person of ordinary skill in the art will understand that in certain embodiments and applications the steam/gas ratio may differ from the ratios particularly described here.

Sour gas shift reactions are generally performed with feed gases that include sulfur species. For example, in one embodiment of the methods as described herein, the feed gas includes one or more sulfur species present in an amount in the range of about 100 ppm to about 4%. In certain embodiments of the methods as described herein, the feed gas includes one or more sulfur species present in an amount in the range of about 200 ppm to about 2%, about 200 ppm to about 1%, 200 ppm to about 0.5%, about 1000 ppm to about 4%, about 1000 ppm to about 2%, about 1000 ppm to about 1%, about 1000 ppm to about 0.5%, about 300 ppm to about 1,200 ppm, about 500 ppm to about 1,000 ppm, about 1,000 ppm to about 2,000 ppm, or about 1,000 ppm to about 1,500 ppm. Of course, the person of ordinary skill in the art will understand that in certain embodiments and applications the amount of sulfur species may differ from the amounts particularly described here.

In certain embodiments, it can be undesirable to run the shift reactions at equilibrium conversion rates. Accordingly, in certain embodiments, the methods as described herein are performed at a conversion that is only a fraction of the equilibrium conversion level. For example, in one embodiment of the methods as described herein, the reaction of the carbon monoxide-containing feed gas with steam in contact with the catalyst material is performed at a conversion that is less than 80%, less than 70%, less than 60%, or even less than 50% of the equilibrium conversion level under the reaction conditions. The person of ordinary skill in the art, in view of the present disclosure, will select catalyst material composition and activity and reaction conditions to provide the desired kinetically-limited operation.

In various aspects, the catalyst materials described herein have good mechanical integrity, high geometric surface area, high diffusion efficiency and low pressure drop and are therefore particularly well suited for used in industrial-scale water-gas shift processes, specifically in large scale reactors. For example, in certain embodiments the methods described herein can be performed with catalyst material is present in a reactor in an amount greater than or equal to 10 m$^3$ (e.g., 10 m$^3$ to 1000 m$^3$, 10 m$^3$ to 500 m$^3$, or 10 m$^3$ to 100 m$^3$). Similarly, in certain embodiments, the volume of the feed gas used during the reaction may be greater than or equal to 20,000 m$^3$/h (e.g., 20,000 m$^3$/h to 4,000,000 m$^3$/h, or 20,000 m$^3$/h to 800,000 m$^3$/h).

The person of ordinary skill in the art will appreciate that the feed gas can come from a variety of sources. For example, the feed gas can come from a gasification process, as is well known in the art. The feed gas can come from, for example, the gasification of coal, heavy residues, biomass, waste and other carbon-rich feedstocks.

EXAMPLES

The catalyst materials and methods of the disclosure are illustrated further by the following examples, which are not to be construed as limiting the disclosure in scope or spirit to the specific procedures and in them.

Example 1 (Comparative)

1000 g of Alumina and 150 g of magnesium oxide were thoroughly mixed. The mixture was moistened with dilute acetic acid and extruded to a smooth cylinder, then dried and calcined. 2.5% Co and 7.3% Mo were loaded onto the carrier by co-dipping in ammonia solution. The sample was obtained after drying and calcination at 450° C. (Cat-1).

Example 2 (Comparative)

1000 g of Alumina was moistened with dilute acetic acid and extruded to a smooth cylinder, then dried and calcined. 1.1% Co-6.4% Mo and 7.8% K were loaded onto the carrier by co-dipping in ammonia solution. The sample was obtained after drying and calcination at 450° C. (Cat-2).

Example 3 (Comparative)

1000 g of Alumina and 150 g of magnesium oxide were thoroughly mixed. The mixture was tableted with graphite as lubricant followed by drying and calcination. 2.4% Co and 7.4% Mo were loaded onto the carrier by co-dipping in ammonia solution. The sample was obtained after drying and calcination at 450° C. (Cat-3).

Example 4

300 g of Alumina and 45 g of magnesium oxide were thoroughly mixed. The mixture was moistened with dilute acetic acid then extruded to a smooth cylinder with a hole in the middle. The extrudate was cut to pellets, then dried and calcined. 2.6% Co and 7.4% Mo were loaded onto the carrier by co-dipping in ammonia solution. The sample was obtained after drying and calcination at 450° C. (Cat-4).

Example 5

1000 g of Alumina and 150 g of magnesium oxide were thoroughly mixed. The mixture was moistened with dilute acetic acid then extruded to a smooth cylinder with a hole in the middle. The extrudate was cut to pellets, then dried and calcined. 2.5% Co and 7.4% Mo were loaded onto the carrier by co-dipping in ammonia solution. The sample was obtained after drying and calcination at 450° C. (Cat-5).

Example 6

1000 g of Alumina was moistened with dilute lanthanum nitrate solution then extruded to a smooth cylinder with a hole in the middle. The extrudate was cut to pellets, then dried and calcined. 1.2% Co-6.5% Mo and 7.6% K were loaded onto the carrier (1.2% La on Alumina) by co-dipping in ammonia solution. The sample was obtained after drying and calcination at 450° C. (Cat-6).

Example 7

1000 g of Alumina and 150 g of magnesium oxide were thoroughly mixed. The mixture was moistened with dilute acetic acid then extruded to a smooth cylinder with a hole in the middle. The extrudate was cut to pellets, then dried and calcined. 2.4% Co and 7.8% Mo were loaded onto the carrier by co-dipping in ammonia solution. The sample was obtained after drying and calcination at 450° C. (Cat-7).

Example 8

1000 g of Alumina and 150 g of magnesium oxide were thoroughly mixed. The mixture was tableted with alumina Al-stearate as lubricant, then dried and calcined. 2.5% Co and 7.4% Mo were loaded onto the carrier by co-dipping in ammonia solution. The sample was obtained after drying and calcination at 450° C. (Cat-8).

Example 9

1000 g of Alumina and 150 g of magnesium oxide were thoroughly mixed. The mixture was tableted with alumina Al-stearate as lubricant, then dried and calcined. 2.4% Co and 7.5% Mo were loaded onto the carrier by co-dipping in ammonia solution. The sample was obtained after drying and calcination at 450° C. (Cat-9).

Example 10

1000 g of Alumina and 150 g of magnesium oxide were thoroughly mixed. The mixture was tableted with alumina Al-stearate as lubricant, then dried and calcined. 2.4% Co and 7.4% Mo were loaded onto the carrier by co-dipping in ammonia solution. The sample was obtained after drying and calcination at 450° C. (Cat-10).

Example 11

1000 g of Alumina and 150 g of magnesium oxide were thoroughly mixed. The mixture was tableted with alumina Al-stearate as lubricant, then dried and calcined. 2.3% Co and 7.4% Mo were loaded onto the carrier by co-dipping in ammonia solution. The sample was obtained after drying and calcination at 450° C. (Cat-11).

Example 12

1000 g of Alumina and 150 g of magnesium oxide were thoroughly mixed. The mixture was tableted with alumina Al-stearate as lubricant, then dried and calcined. 2.3% Co and 7.5% Mo were loaded onto the carrier by co-dipping in ammonia solution. The sample was obtained after drying and calcination at 450° C. (Cat-12).

Example 13

1000 g of Alumina and 150 g of magnesium oxide were thoroughly mixed. The mixture was tableted with alumina Al-stearate as lubricant, then dried and calcined. 2.4% Co and 7.4% Mo were loaded onto the carrier by co-dipping in ammonia solution. The sample was obtained after drying and calcination at 450° C. (Cat-13).

Catalyst Performance Testing

Samples made in the above examples were tested for in the sour gas shift reaction in a set of tubular reactors (ID=19 mm) with 20 mL whole particle loading. All samples were sulfided in-situ at 320° C. with $H_2S/H_2$ mixed gas before performing sour gas shift process.

Test 1

Samples of Cat-2 and Cat-6 were tested at 200 psi, steam/gas=0.5, $H_2S$=1000 ppm, DGSV=6000 $h^{-1}$, CO:$CO_2$:$H_2$:$N_2$=42:16:33:9. The results are presented in Table 1.

Test 2

Samples Cat-1, Cat-3, Cat-4, Cat-5, Cat-7, Cat-8, Cat-9, Cat-10, Cat-11, Cat-12 and Cat-13 were tested at 200 psi, steam/gas=1.0, $H_2S$=1500 ppm, DGSV=3000 $h^{-1}$, CO:$CO_2$:$H_2$:$N_2$=42:16:33:9. The results are presented in Table 1.

TABLE 1

Catalyst Testing Results

| | Cat-1 | Cat-2 | Cat-3 | Cat-4 | Cat-5 | Cat-6 | Cat-7 | Cat-8 | Cat-9 | Cat-10 | Cat-11 | Cat-12 | Cat-13 |
|---|---|---|---|---|---|---|---|---|---|---|---|---|---|
| Shape | Ext. | Ext. | Tab. | Pel. | Pel. | Pel. | Ext. | Tab. | Tab. | Tab. | Tab. | Tab. | Tab. |
| W (mm) | 4.0 | 3.9 | 3.9 | 3.8 | 4.3 | 4.2 | 6.5 | 3.9 | 4.7 | 4.7 | 6.1 | 6.3 | 8.1 |
| T (mm) | | | | 1.3 | 1.7 | 1.7 | 1.9 | 1.5 | 1.7 | 1.4 | 1.8 | 1.6 | 2.5 |
| $L^1$ (mm) | 5.0 | 5.0 | 3.9 | 5.1 | 5.2 | 4.2 | 5.2 | 3.9 | 4.7 | 4.7 | 5.9 | 5.9 | 5.9 |
| $(T/\beta)_{min}$ | | | | 0.34 | 0.40 | 0.40 | 0.29 | 0.38 | 0.36 | 0.29 | 0.30 | 0.25 | 0.31 |
| Side crush (N/mm) | 14.9 | 17.2 | 13.1 | 6.8 | 8.3 | 9.5 | 3.8 | 10.2 | 9.6 | 5.8 | 7.0 | 5.2 | 8.5 |
| End crush (N/mm) | 130 | 138 | 150 | 110 | 118 | 115 | 38 | 125 | 130 | 75 | 72 | 65 | 89 |
| Bulk crush (MPa) | 1.7 | 1.8 | 2.7 | 0.9 | 2.1 | 2.2 | 0.6 | 2.6 | 2.4 | 0.9 | 1.7 | 0.8 | 2.1 |
| SA_BET ($m^2$/g) | 201 | 221 | 198 | | 186 | 114 | | 124 | | | 130 | | |
| PV ($m^2$/g) | 0.38 | 0.50 | 0.35 | | 0.51 | 0.55 | | 0.41 | | | 0.45 | | |
| GSA ($ft^2/ft^3$) | 241 | 241 | 250 | | 285 | 288 | | 298 | | | 220 | | |
| Delta P, Rel. | 1 | 1 | 1.14 | | 0.72 | 0.75 | | 0.80 | | | 0.42 | | |

TABLE 1-continued

Catalyst Testing Results

| | Cat-1 | Cat-2 | Cat-3 | Cat-4 | Cat-5 | Cat-6 | Cat-7 | Cat-8 | Cat-9 | Cat-10 | Cat-11 | Cat-12 | Cat-13 |
|---|---|---|---|---|---|---|---|---|---|---|---|---|---|
| [2]Activity, X % CO | 73.5 | 77.4 | 76.2 | | 78.5 | 82.8 | | 80.2 | | | 75.5 | | |

Note:
Ext. = extrusion;
Pel. = pellet;
Tab. = tablet;
SA_BET = Brunauer-Emmett-Teller surface area;
PV = pore volume;
GSA = geometric surface area;
Activity = performance in gas-shift reaction.
[1]Extrusion was cut to ~5 mm for side and end crush measurement. The rest of the measurements used original extrusion with 7~15 mm length.
[2]Test 1 was used for Cat-2 and Cat-6. Test 2 was used for the rest of the samples.

We claim:

1. A catalyst material in the shape of an annular solid, the annular solid having a cross-sectional shape having
   a lateral outer surface;
   a single hole in the annular solid, the hole defining a lateral inner surface of the annular solid, the lateral outer surface and the lateral inner surface defining an annular wall, wherein the annular wall has a minimum wall thickness in the range of 1.5 mm to 3 mm;
   an average width in the range of about 3.3 mm to about 10 mm as measured through the geometrical center of the cross-sectional shape of the solid; and
   a length measured in a direction parallel to the hole, the length being in the range of about 2 mm to about 30 mm;
   wherein the minimum ratio of wall thickness to width measured along the line of the wall thickness is at least about 0.3 to about 0.45,
   wherein the catalyst material comprises one or more catalytically-active metal species, the catalytically-active metal species including cobalt and molybdenum species,
   wherein the catalyst material comprises a carrier material that is aluminum oxide or aluminum oxide in combination with magnesium oxide, wherein the carrier material is at least about 75% aluminum oxide, and
   wherein the catalyst material has a BET surface area of about 50 to about 400 m$^2$/q.

2. The catalyst material of claim 1, wherein the average width is in the range of about 5 mm to about 10 mm.

3. The catalyst material of claim 1, wherein the average width is in the range of about 3.3 mm to about 7.0 mm.

4. The catalyst material of claim 1, wherein the length of the annular solid is in the range of about 3 mm to about 10 mm.

5. The catalyst material of claim 1, wherein the average ratio of wall thickness to the width as measured along the same line as the wall thickness is about 0.3 to about 0.4.

6. The catalyst material of claim 1, wherein the hole has an average diameter of at least about 1 mm.

7. The catalyst material of claim 1, wherein the annular body includes one or more protrusions or indentations formed in its lateral outer surface.

8. The catalyst material of claim 1, wherein the catalyst material exhibits a side-to-side crush strength of at least 7 N/mm, an end-to-end crush strength of at least 70 N/mm, and a bulk crush strength of at least 1.0 MPa.

9. The catalyst material of claim 1, in sulfided form.

10. A method for converting carbon monoxide and steam to carbon dioxide and hydrogen, the method comprising reacting a carbon monoxide-containing feed gas with steam in contact with a catalyst material of claim 1 at a reaction temperature in the range of about 180° C. to about 550° C., wherein the volume of the feed gas is greater than or equal to 20,000 m$^3$/h.

11. A method for converting carbon monoxide and steam to carbon dioxide and hydrogen, the method comprising sulfiding a catalyst material of claim 1 to provide a sulfided catalyst material; and reacting a carbon monoxide-containing feed gas with steam in contact with the sulfided catalyst material at a reaction temperature in the range of about 180° C. to about 550° C., wherein the volume of the feed gas is greater than or equal to 20,000 m$^3$/h.

12. The method according to claim 11, wherein the pressure of the feed gas is in the range of about 0.1 MPa to about 12 MPa.

13. The method according to claim 11, wherein the steam gas ratio is about 0.5 to about 2.5.

14. The method according to claim 11, wherein the pressure of the feed gas is in the range of about 4 MPa to about 12 MPa, and the steam gas ratio is about 0.5 to about 2.5.

15. The method according to claim 10, wherein the pressure of the feed gas is in the range of about 4 MPa to about 12 MPa, and the steam gas ratio is about 0.5 to about 2.5.

16. The catalyst material of claim 1, wherein the annular wall has a minimum wall thickness in the range of 1.6 mm to 3 mm.

17. The catalyst material of claim 1, wherein the average width is in the range of about 5 mm to about 8 mm.

18. The catalyst material of claim 1, wherein the BET surface area is in the range of about 100 to about 400 m$^2$/g.

19. The catalyst material of claim 1, wherein the average width is in the range of about 3.3 mm to about 8 mm, and wherein the BET surface area is in the range of about 100 to about 400 m$^2$/g.

20. The catalyst material of claim 19, wherein the catalyst material exhibits a side-to-side crush strength of at least 7 N/mm, an end-to-end crush strength of at least 70 N/mm, and a bulk crush strength of at least 1.0 MPa.

21. The catalyst material of claim 1, wherein the catalyst material is a calcinate of an aluminum-containing precursor calcined at a temperature in the range of 300-600° C.

* * * * *